United States Patent
Chang et al.

(10) Patent No.: US 6,886,413 B1
(45) Date of Patent: May 3, 2005

(54) FLOW RATE SENSOR

(76) Inventors: Chien-Tang Chang, Room 4, 16F, No. 724, Jhongming S. Rd., South District, Taichung City 402 (TW); Tai-Sheng Lin, No. 99, Badejung Rd., Renwu Shiang, Kaohsiung 814 (TW)

( * ) Notice: Subject to any disclaimer, the term of this patent is extended or adjusted under 35 U.S.C. 154(b) by 56 days.

(21) Appl. No.: 10/843,051

(22) Filed: May 10, 2004

(51) Int. Cl.[7] ............................................. G01F 1/44
(52) U.S. Cl. ................................................. 73/861.63
(58) Field of Search ........................ 73/861.63, 861.52, 73/861.58, 861.64

(56) References Cited

U.S. PATENT DOCUMENTS

| | | | |
|---|---|---|---|
| 6,314,821 B1 * | 11/2001 | Allan | 73/861.52 |
| 6,339,963 B1 * | 1/2002 | Torkildsen | 73/861.63 |
| 6,647,808 B2 * | 11/2003 | Sato et al. | 73/861.63 |
| 6,688,184 B2 * | 2/2004 | Army et al. | 73/861.63 |

* cited by examiner

Primary Examiner—Edward Lefkowitz
Assistant Examiner—Jewel V. Thompson
(74) Attorney, Agent, or Firm—Alan D. Kamrath; Nikolai & Mersereau, P.A.

(57) ABSTRACT

A flow rate sensor includes a first body and a second body airtightly and detachably abutting each other. The first body and the second body respectively-include a passage defined therein. The two passages are tapered relative to each other. The first body and the second body respectively have a path defined therein. The two paths respectively communicate with a corresponding one of the two passages in the first and second bodies. A sensing device is airtightly sandwiched between the first and second body and corresponds to the two paths for calculating the different of the fluid that flows through the two passages in the first and second bodies.

7 Claims, 8 Drawing Sheets

FLOW RATE SENSOR

BACKGROUND OF THE INVENTION

1. Field of the Invention

The present invention relates to sensor, and more particularly to a flow rate sensor.

2. Description of Related Art

Figure 7:
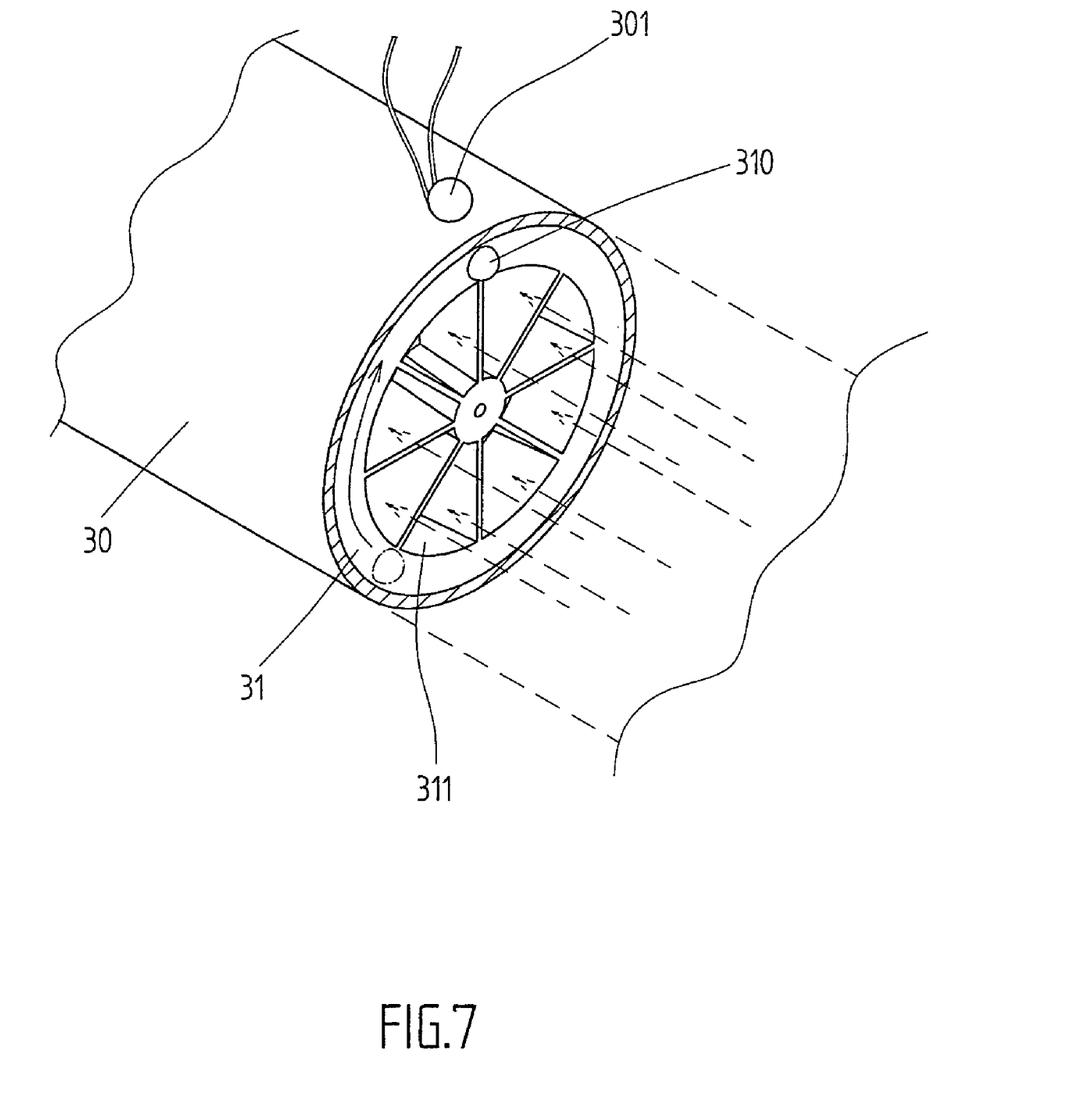
FIG. 7 is a conventional mechanical flow rate sensor in accordance with the prior art.

A conventional mechanical flow rate sensor in accordance with the prior art shown in FIG. 7 comprises tube (30) and a propeller (31) rotatably mounted in the tube (30). The propeller (31) peripherally abuts an inner periphery of the tube (30) such that the propeller (31) is rotated when the fluid passing through the propeller (31) in the tube (30).

A magnetic sensor (301) is secured on an outer periphery of the tube (30). The propeller (31) includes multiple blades (not numbered) and a magnet (310) is securely in a distal end of a corresponding one of the multiple blades of the propeller (31). The magnetic sensor (301) measures the rotation rate of the propeller (31) by sensing the rotation force of the magnet (310) during turning around to calculate the flow rate in the tube (30).

However, the dirt in the fluid may be adhered on the blades of the propeller (31) after being used for a period of time and the propeller would not be smoothly operated. Consequently, the accuracy of the conventional flow rate sensor is debased.

Figure 8:
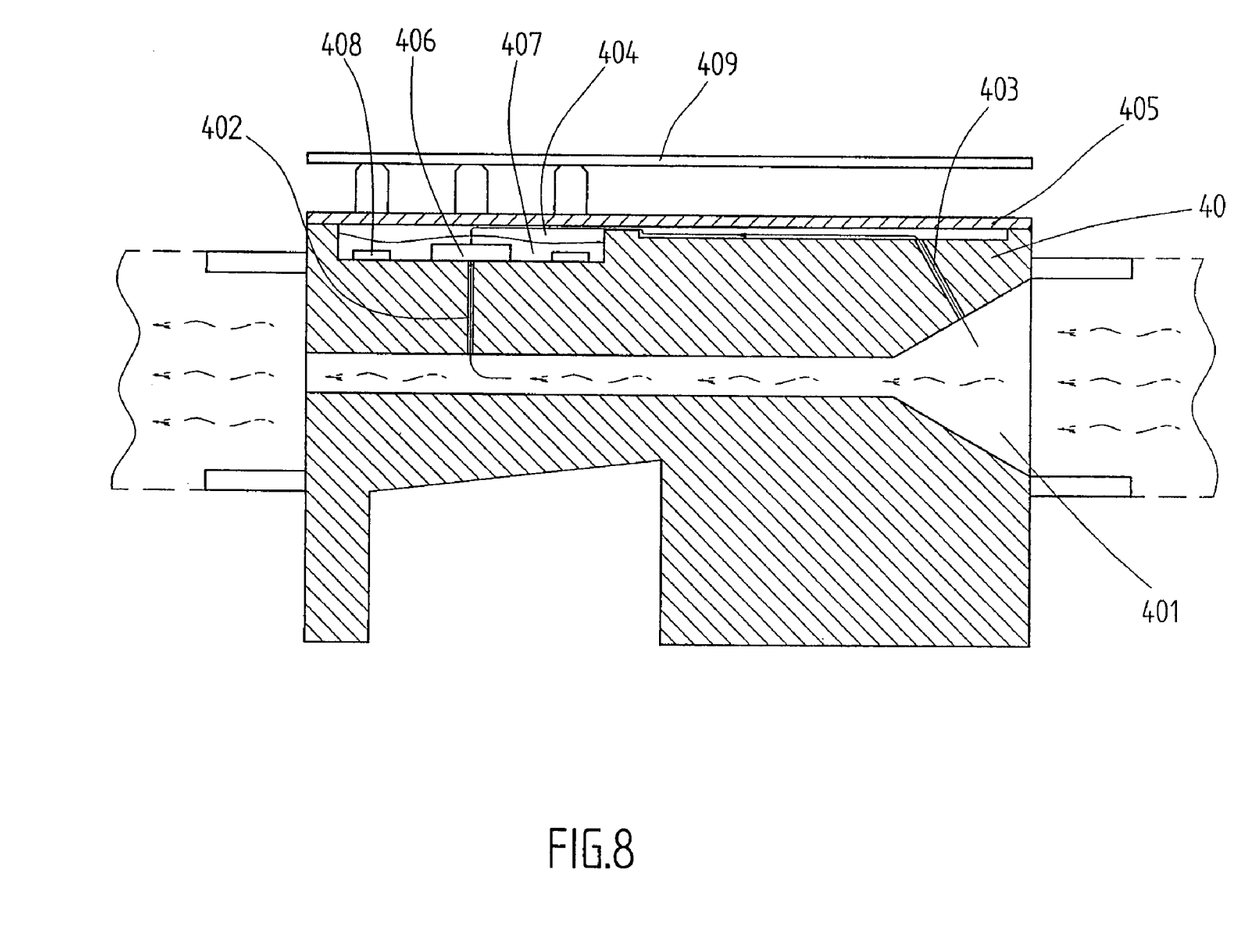
FIG. 8 is a conventional digital flow rate sensor in accordance with the prior art.

For solving the above problem, a conventional digital flow rate sensor, as shown in FIG. 8, is marketed. The conventional digital flow rate sensor includes a body (40) having a passage (401) linearly defined in and extending through the body (40). A recess (404) is defined in a top portion of the body (40). A first path (402) is defined in the body (40) and communicates with the passage (401) and a first end of the recess (404), and a second path (403) is defined in the body (40) and communicates with the passage (401) and a second end of the recess (404). A cover (405) is securely attached to the top portion of the body (40) by radiofrequency welding for closing the recess (404). A chip (406) is secured on a bottom of the recess (404) and corresponds to the first path (402) in the body (40) for calculating a different of a pressure in the passage (401) via the second path (403) and the first path (402). Multiple leads (408) are embedded in a bottom of the recess is (404) and electrically connected to the chip (406). Each lead (408) extending through the cover (405) and electrically connected to a circuit board (409). The chip (406) and the leads (408) in the recess (404) are packaged by porosity glue (407).

However, the chip (406) may be wetted and causes a leakage of electricity when the fluid flows through the passage and the pressure in the recess (404) is continually raised. The porosity glue (407) may contain the fluid from the recess (404) and cause a short circuit on the chip (406). In addition, the cover (405) is welded to the body (10) for closing the recess in the body (10) by radiofrequency welding. However, the radiofrequency welding cannot provide a completely airtight effect between the body (40) and the cover (405).

The present invention has arisen to mitigate and/or obviate the disadvantages of the conventional flow rate sensors.

SUMMARY OF THE INVENTION

The main objective of the present invention is to provide an improved flow rate sensor that can be conveniently maintained.

To achieve the objective, the flow rate sensor in accordance with the present invention comprises a first body including a first side and a second side opposite to each other. A first passage is defined in the first body and communicates with the first side and the second side. The first passage has a diameter gradually reduced relative to the second side of the first body. A first path is defined in the first body. The first path extends to the second side of the first body and communicates with the first passage for transmitting a different of a pressure value in the first passage. A second body airtightly and detachably abuts to the second side of the first body. The second body has a first side and a second side opposite to each other. The second side of the second body abuts the second side of the first body. A second passage is defined in the second body and communicates with the first side and the second side of the second body. The second passage has a diameter gradually reduced relative to the second side of the second body and co-axially communicates with the first passage in the first body. A second path is defined in the second body. The second path extends to the second side of the second body and communicates with the second passage for transmitting a different of a pressure value in the second passage. The second path in the second body corresponds to the first path in the first body. A sensing device is sandwiched between the first body and the second body and has a top portion extending out of the first body and the second body. A chip is securely attached to one side of the sensing device facing the second path in the second body and corresponds to the first path in the first body for calculating the different of a pressure value from the first passage and the second passage. A first O-ring is airtightly mounted between the first body and the sensing device and a second O-ring is airtightly mounted between the sensing device and the second body. The first O-ring and the second O-ring fully contains waterproof glue to prevent the sensing from being wetted due to the fluid in the flow rate sensor.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–4, a flow rate sensor in accordance with the present invention comprises a first body (10), a second body (11) detachably airtightly abutting each other and a sensing device (13) sandwiched between the first body (10) and the second body (11).

The first body (10) has a first side opposite to the second body (11) and a second side facing the second body (11). A first joint (101) extends from the first side of the first body (10) and a first passage (102) defined in the first body (10). The first passage (102) extends through the first body (10) and the first joint (101), and has a diameter that is gradually reduced relative to the second body (11). A first annular (103) is defined in the second side of the first body (10) around the first passage (102). A first concave portion (104) is defined in a top portion of the second side of the first body (10) and a first cavity (105) is defined in a bottom of the concave portion (104). A first path (106) is defined in the first body (10) and communicates with the first passage (102) and the first cavity (105) for transmitting the pressure value of the fluid in the first passage (102) to the sensing device (13).

The second body (11) has a structure reversely corresponding to that of the first body (10). Consequently, the second body (11) comprises a second joint (111) extending from a first side of the second body (11), a second passage (112) co-axially communicating with the first passage (102) in the first body (10), a second annular groove (113) completely communicating with the first annular groove (103) in the first body (10), a second concave portion (114) facing the first concave portion (104) in the first body (10), a second cavity (115) co-axially corresponding to the first cavity (105) in the first body (10) and a second path (116) defined to communicate with the second passage (112) and the second cavity (115). The second passage (112) has a diameter that is gradually reduced relative to the first body (10).

Figure 1:
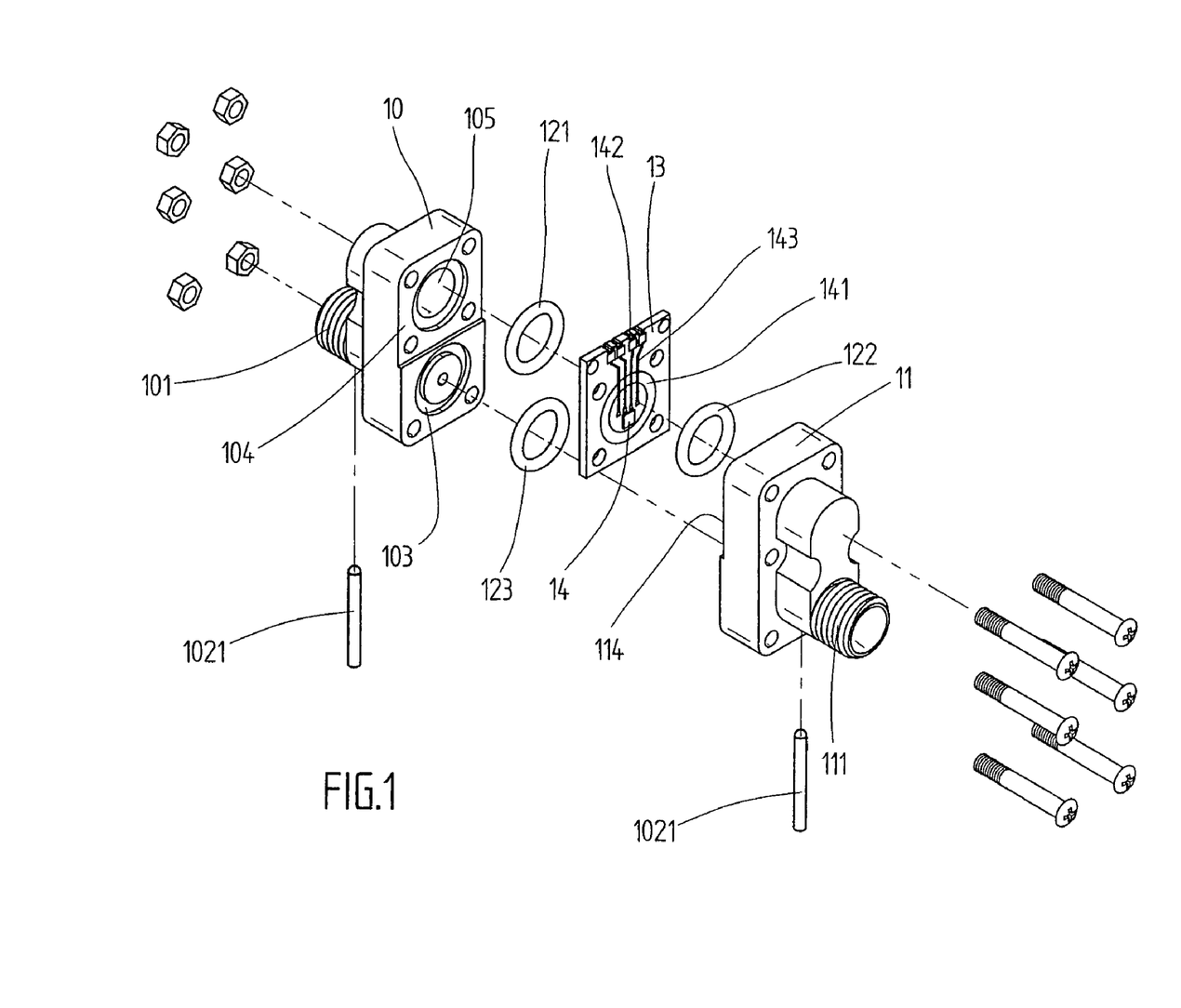
FIG. 1 is an exploded perspective view of a flow rate sensor in accordance with the present invention.
Figure 2:
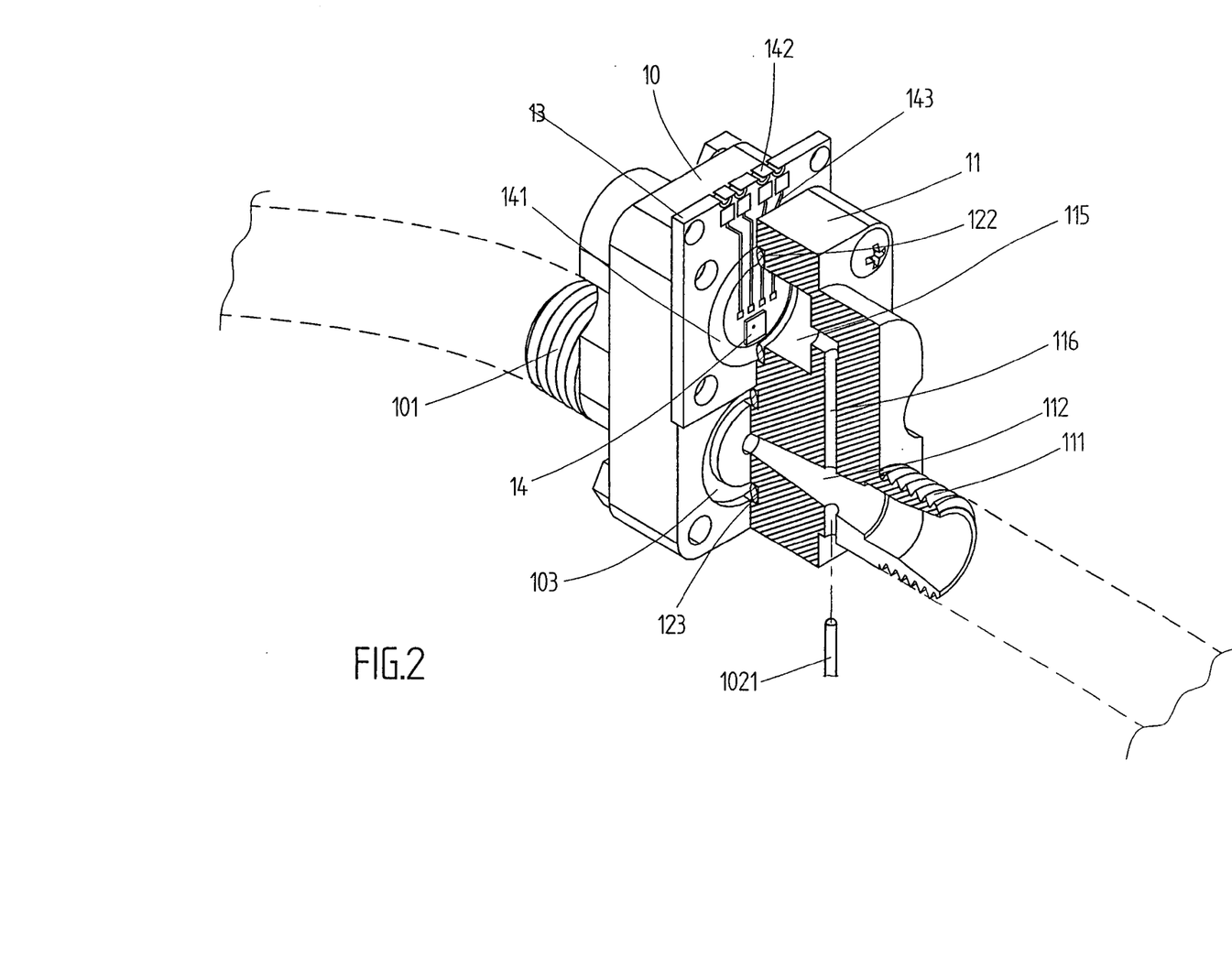
FIG. 2 is a perspective view in partial cross-section of the flow rate sensor in accordance with the present invention.
Figure 3:
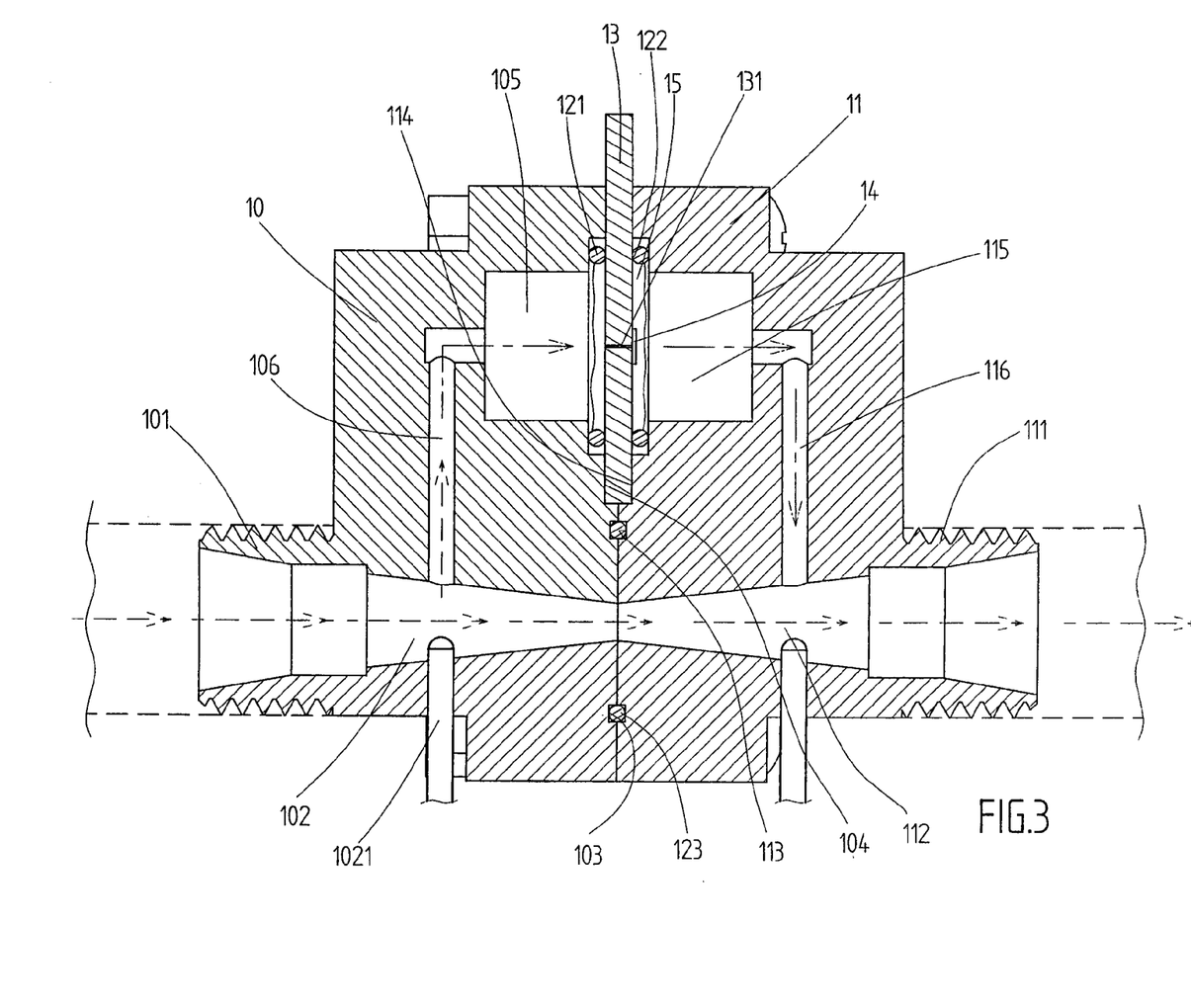
FIG. 3 is a cross-sectional view of the flow rate sensor in FIG. 2.
Figure 4:
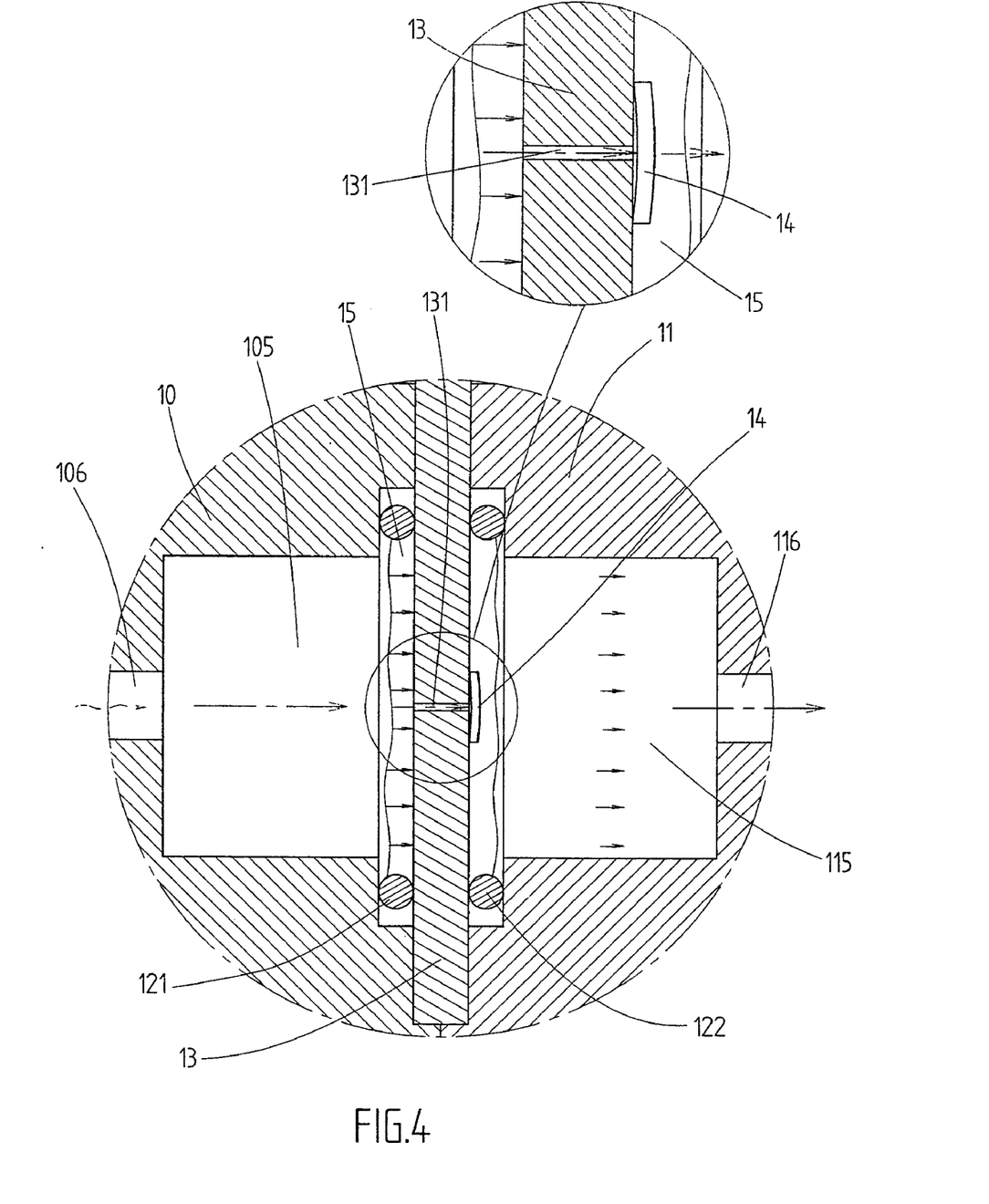
FIG. 4 is a partially cross-sectional view of the flow rate sensor in FIG. 2.
Figure 5:
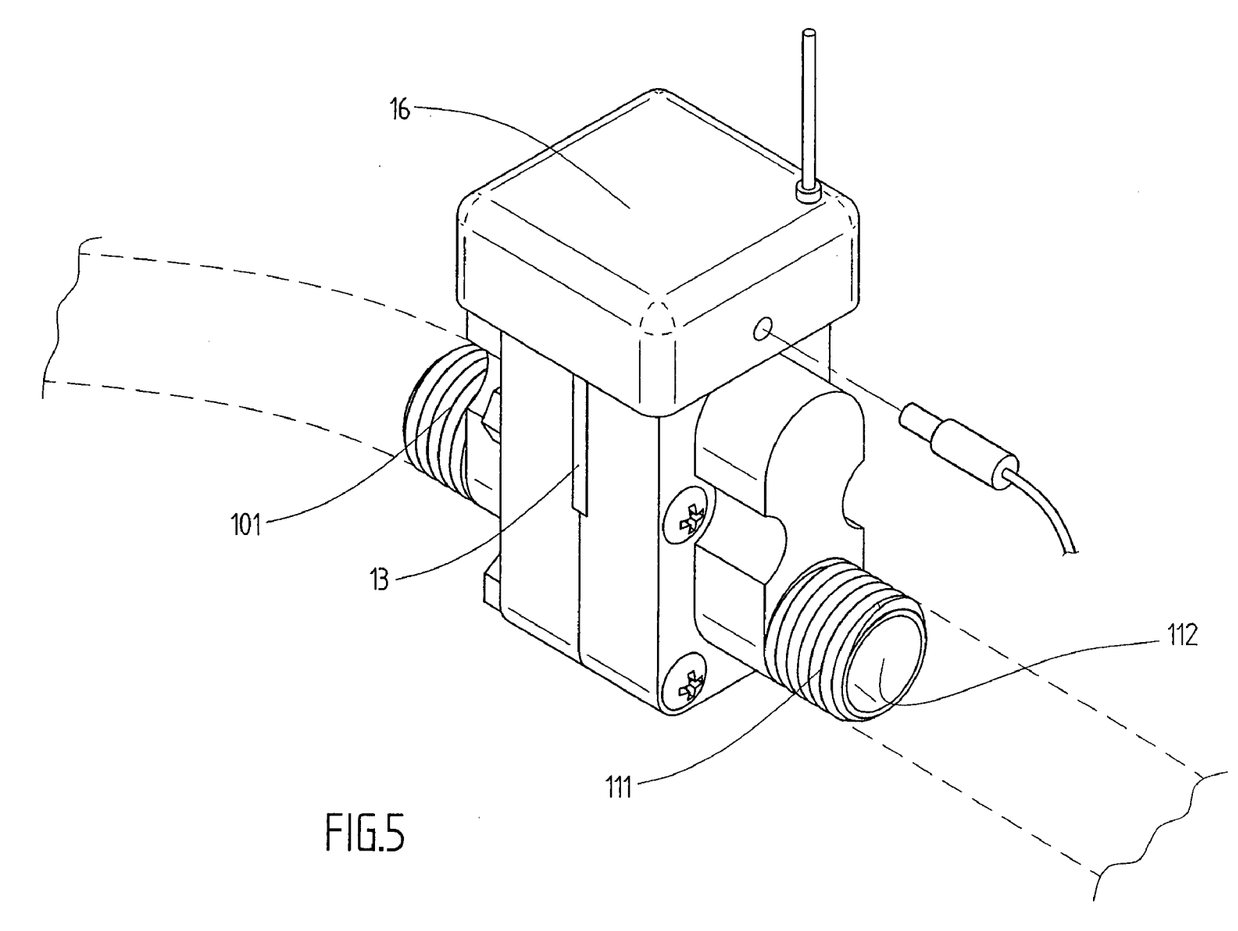
FIG. 5 is a perspective view of the flow rate sensor of the present invention on which a transmission device.

The sensing device (13) is securely clamped between the first body (10) and the second body (11) and securely received in the first concave portion (104) in the first body (10) and the second concave portion (114) in the second body (11). The sensing device (13) has a top portion extends out of the first body (10) and the second body (11). The sensing device (13) includes a through hole (131) defined therein and communicating with the first cavity (105) in the first body (10) and the second cavity (115) in the second body (11). A chip (14) is attached to the sensing device (13), closing the through hole (131) and received in the second cavity (115) in the second body (11). The sensing device (123) has two opposite sides each having a plane (141) formed thereon and corresponding to the first cavity (105) in the first body (10) and the second cavity (115) in the second body (11). The sensing device (13) has multiple leads (142) secured on the top portion thereof and electrically connected to a transmission device (16), as shown in FIG. 5. Each lead (142) is electrically connected to the chip (14) by a circuit (143). The transmission device (16) transmits the data from the chip (14) to a display (not shown) for showing the data from the chip (14). For providing an airtight effect among the first body (10), the second body (11) and the sensing device (13), a first O-ring (121) is clamped between the first body (10) and a corresponding one of the two planes (141) of the sensing device (13), a second O-ring (122) is clamped between a corresponding one of the two planes (141) on the sensing device (13) and the second body (11), and a third O-ring (123) is secured received in the first annular groove (103) and the second annular groove (113). For protecting the chip (14) the two opposite sides of the sensing device (13) is glued with waterproof glue (15) within the first O-ring (121) and the second O-ring (122).

When operating the flow rate sensor in accordance with the present invention, the air maintained in the first passage (102) flows to push the waterproof glue (15) within the first O-ring (121) toward the second cavity (115) via the first path (106) when the fluid flows into the tapered first passage (102). The air maintained in the second cavity (115) is drawn into the second passage (112) in the second body (11) when the fluid passing through the second passage (112) such that the pressure in the second cavity (115) is reduced and the chip (14) is further curved to calculate the flow rate and speed of the fluid in the first passage (102) and the second passage (112). The data of the fluid passing the first passage (102) and the second passage (112) is transmitted to the leads (142) of the sensing device (13) for showing on the display.

For measuring the quality of the fluid in the flow rate sensor of the present invention, two reaction pins (1021) are respectively inserted into the first body (10) and the second body (11), and extends into the first passage (102) in the first body (10) and the second passage (112) in the second body (11). It is a convenient design for user to control the quality of the fluid in the flow rate sensor in accordance with the present invention.

Figure 6:
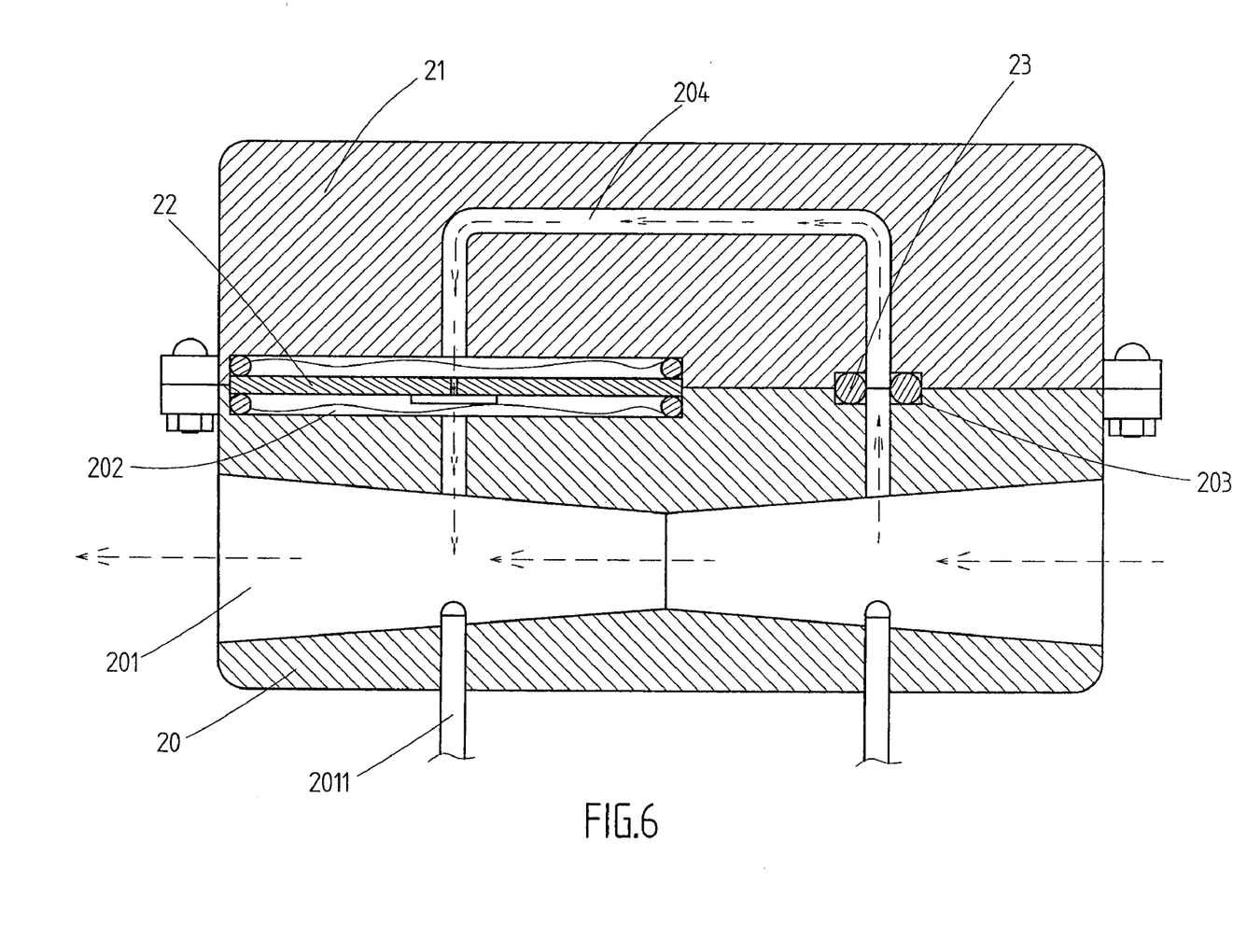
FIG. 6 is a cross-sectional view of a second embodiment of the flow rate sensor in accordance with the present invention.

With reference to FIG. 6 that shows a second embodiment of the flow rate sensor in accordance with the present invention, the flow rate sensor comprises a body (not numbered) including a first portion (20) and a second portion (21) airtightly and detachably abutting to each other. A Venturi type hole (201) is defined in and extending through the first portion (20) of the body. A first chamber (202) and a second chamber (203) are respectively defined in the body between the first portion (20) and the second portion (21). A U-shaped path (204) is defined in the body and sequentially communicating with a front section of the Venturi type hole (201), the second chamber (23), the first chamber (202) and a rear section of the Venturi type hole (201). A sensing device (22), the same as the sensing device numbered as 13, is airtightly received in the first chamber (202) for sensing and transmitting the data of the fluid to a display when the fluid passes through the Venturi type hole (201).

As described above, the flow rate sensor in accordance with the present invention has several advantages as follow.

1. The first body (10) and the second body (11) detachably abut each other and the sensing device (13) is clamped between the first body (10) and the second body (11). Consequently, the sensing device (13) is easily to be replaced when the sensing device is out of order.

2. The top portion of the sensing device (13) extends out of the first body (10) and the second body (11) so that the manufacturer can easily form the leads (142) and the circuit (143) on the sensing device (13).

3. The O-rings (121, 122) and the waterproof glue (15) within the O-rings (121, 122) can prevent the chip (14) and the circuits (143) from being wetted duo to the fluid in the flow rate sensor for extending the using life of the sensing device (13).

Although the invention has been explained in relation to its preferred embodiment, it is to be understood that many other possible modifications and variations can be made without departing from the spirit and scope of the invention as hereinafter claimed.

What is claimed is:

1. A flow rate sensor comprising:
   a first body including a first side and a second side opposite to each other, a first passage defined in the first body and communicating with the first side and the second side, the first passage having a diameter gradually reduced relative to the second side of the first body, a first path defined in the first body, the first path extending to the second side of the first body and communicating with the first passage for transmitting a different of a pressure value in the first passage;

a second body airtightly and detachably abutting to the second side of the first body, the second body having a first side and a second side opposite to each other, the second side of the second body abutting the second side of the first body, a second passage defined in the second body and communicating with the first side and the second side of the second body, the second passage having a diameter gradually reduced relative to the second side of the second body and co-axially communicating with the first passage in the first body, a second path defined in the second body, the second path extending to the second side of the second body and communicating with the second passage for transmitting a different of a pressure value in the second passage, the second path in the second body corresponding to the first path in the first body; and a sensing device sandwiched between the first body and the second body and having a top portion extending out of the first body and the second body, a chip securely attached to one side of the sensing device facing the second path in the second body and corresponding to the first path in the first body for calculating the different of a pressure value from the first passage and the second passage, a first O-ring airtightly mounted between the first body and the sensing device and a second O-ring airtightly mounted between the sensing device and the second body, the first O-ring and the second O-ring fully containing waterproof glue to prevent the sensing from being wetted due to the fluid in the flow rate sensor.

2. The flow rate sensor as claimed in claim 1, wherein the first body comprises a first cavity defined in the second side of the first body, the first cavity communicating with the first path and corresponding to the chip of the sensing device, and the second body comprises a second cavity defined in the second side of the second body, the second cavity co-axially corresponding to the first cavity and communicating with second path.

3. The flow rate sensor as claimed in claim 1, wherein sensing device comprises multiple leads embedded in the top portion thereof and electrically connected to the chip.

4. The flow rate sensor as claimed in claim 2, wherein the first O-ring and the second O-ring are respectively received in the first cavity in the first body and the second cavity in the second body.

5. The flow rate sensor as claimed in claim 2, wherein sensing device comprises multiple leads embedded in the top portion thereof and electrically connected to the chip.

6. The flow rate sensor as claimed in claim 3 further comprising a transmission device electrically connected to the multiple leads of the sensing device for transmitting the data from the sensing device to a display.

7. The flow rate sensor as claimed in claim 5 further comprising a transmission device electrically connected to the multiple leads of the sensing device for transmitting the data from the sensing device to a display.

* * * * *